(12) United States Patent
Olson

(10) Patent No.: US 8,532,156 B2
(45) Date of Patent: Sep. 10, 2013

(54) SEMICONDUCTOR LASER WITH TEST PADS

(75) Inventor: Scott Olson, Eagan, MN (US)

(73) Assignee: Seagate Technology LLC, Cupertino, CA (US)

( * ) Notice: Subject to any disclaimer, the term of this patent is extended or adjusted under 35 U.S.C. 154(b) by 107 days.

(21) Appl. No.: 13/231,529

(22) Filed: Sep. 13, 2011

(65) Prior Publication Data

US 2013/0064500 A1 Mar. 14, 2013

(51) Int. Cl.
*H01S 3/097* (2006.01)
*G01R 31/20* (2006.01)
*G01R 31/26* (2006.01)

(52) U.S. Cl.
USPC ............................ 372/87; 324/754.01; 438/18

(58) Field of Classification Search
USPC .................. 372/81, 87; 324/754.01, 754.03; 438/18
See application file for complete search history.

(56) References Cited

U.S. PATENT DOCUMENTS

| | | | |
|---|---|---|---|
| 6,822,329 B2 | 11/2004 | Varrot et al. |
| 7,157,734 B2 | 1/2007 | Tsao et al. |
| 7,196,428 B2 | 3/2007 | Chen |
| 7,323,784 B2 | 1/2008 | Yiu et al. |
| 7,372,153 B2 | 5/2008 | Kuo et al. |
| 7,391,114 B2 | 6/2008 | Mimura et al. |
| 7,501,704 B2 | 3/2009 | Marsanne et al. |
| 7,592,710 B2 | 9/2009 | Hsia et al. |
| 7,629,689 B2 | 12/2009 | Maeda |
| 2002/0139567 A1 | 10/2002 | Kim et al. |
| 2010/0117080 A1 | 5/2010 | Chen et al. |

*Primary Examiner* — Armando Rodriguez
(74) *Attorney, Agent, or Firm* — Hollingsworth Davis, LLC

(57) ABSTRACT

A laser diode includes a junction surface configured to interface with an integrated optics slider. Cathode and anode electrical junctions are disposed on the junction surface. The cathode and anode electrical junctions are configured for electrical and mechanical coupling to the integrated optics slider. At least one test pad is disposed on the junction surface that is physically separate from and electrically coupled to one of the cathode and anode electrical junctions. The test pad is configured to be contacted by a test probe and is not configured for electrical or mechanical coupling to the integrated optics slider.

20 Claims, 5 Drawing Sheets

SEMICONDUCTOR LASER WITH TEST PADS

SUMMARY

Various embodiments described herein are generally directed to semiconductor lasers used in applications such as heat assisted magnetic recording. In one embodiment, a laser diode includes a junction surface configured to interface with an integrated optics slider. Cathode and anode electrical junctions are disposed on the junction surface. The cathode and anode electrical junctions are configured for electrical and mechanical coupling to the integrated optics slider. At least one test pad is disposed on the junction surface. The test pad is physically separate from and electrically coupled to one of the cathode and anode electrical junctions. The test pad is configured to be contacted by a test probe and is not configured for electrical or mechanical coupling to the integrated optics slider.

In another embodiment, a method involves forming a junction surface of a laser diode. The junction surface includes cathode and anode electrical junctions and at least one test pad electrically coupled to one of the cathode and anode electrical junctions. The laser diode is tested via a test probe applied to the at least one test pad. The test probe does not contact the cathode and anode electrical junctions. Solder is reflowed between the cathode and anode electrical junctions and corresponding junctions of an integrated optics slider to bond the laser diode to the integrated optics slider. The solder does not bond the test pad to the integrated optics slider.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
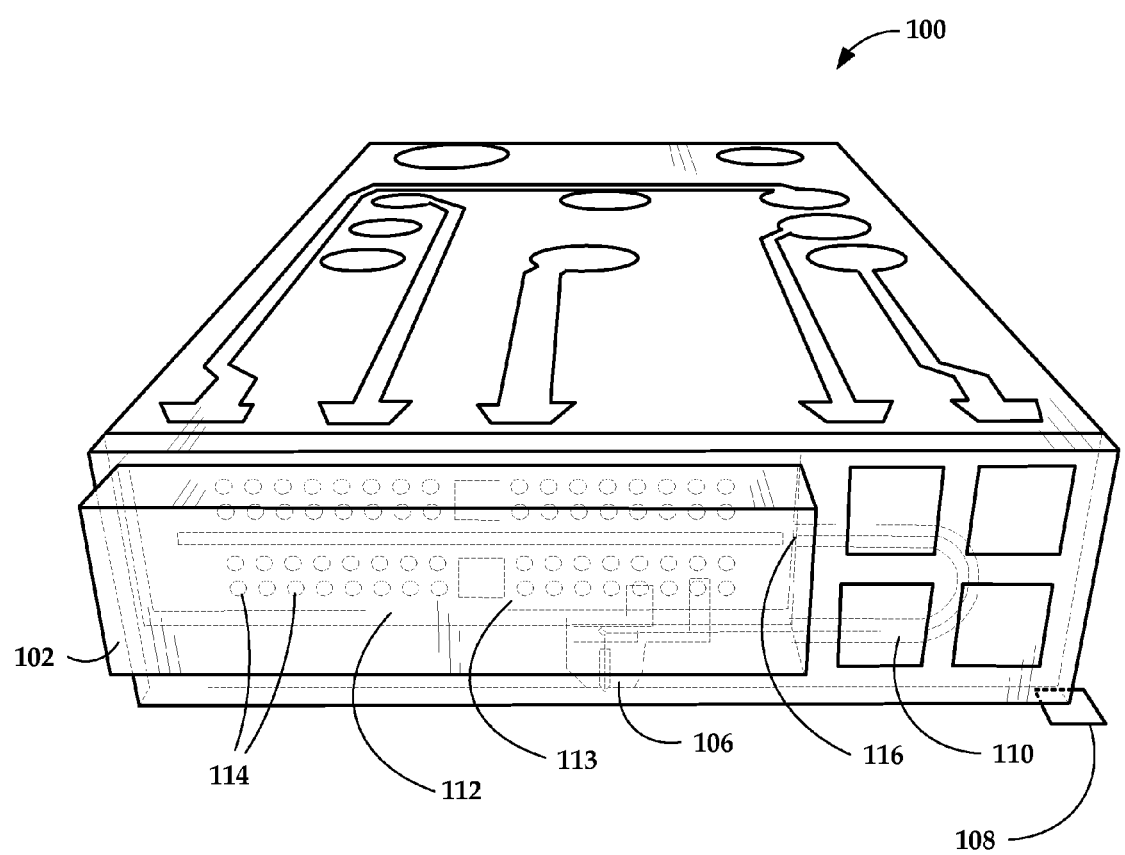
FIG. 1 is a perspective view of a hard drive slider assembly according to an example embodiment.

The present disclosure relates to optical components used in applications such as heat assisted magnetic recording (HAMR). A HAMR device uses heat to overcome superparamagnetic effects that might otherwise limit the areal data density of typical magnetic recording media (e.g., hard drive disk). Recording on this media may involve heating a small portion of the media while it is being written to by a magnetic write head. The hot spot may be created from a coherent light source such as a laser diode. Optical components may be integrated into a hard drive slider to direct energy from the laser diode to the media.

One way to achieve a tiny confined hot spot is to use an optical near-field transducer (NFT), such as a plasmonic optical antenna or an aperture, located near an air bearing surface of a hard drive slider. Light is launched from a light source (e.g., a laser diode) into an optical waveguide built into a slider from a core and cladding with different indices of refraction. The waveguide may include a high contrast between respective refractive indices of the core and cladding. Light propagating in the waveguide may be directed to an optical focusing element, such as a planar solid immersion mirror (PSIM), which may concentrate the energy into the optical NFT. In other configurations, the waveguide may delivery light to the NFT without using a focusing element, e.g., direct delivery.

The NFT may be integrated optics devices formed within the slider. The field of integrated optics relates to the construction of optics devices on substrates, sometimes in combination with electronic components, to produce functional systems or subsystems. For example, light may be transferred between components via integrated optics waveguides that are built up on a substrate using layer deposition techniques. These waveguides may be formed using a first material as core, surrounded by a second material that acts as cladding. Other optical components may be formed in similar fashion, including the NFT and PSIM discussed above.

In a HAMR slider, light is launched into these integrated optics components for purposes of delivering optical energy to heat the media during the recording process. One way to launch light into a slider is from free space by a grating coupler fabricated in a slider, called free space light delivery. Free space light delivery assembly may utilize a laser located external to the drive head. Another way to provide light energy for HAMR recording is to form/assemble a laser light source (e.g., a laser diode) integrally with the slider. This arrangement is referred to herein as laser-in-slider light delivery. Laser-in-slider light assemblies may be built during wafer-level or slider-level manufacturing phases.

A HAMR device may also need to integrate a variety of optical devices into the slider along with electrical components such as read-write heads. In one configuration, a laser-in-slider device may be formed by assembling a separate laser diode component to the slider during slider manufacturing. This may require performing additional assembly and testing operations during slider manufacture. Precision and reliability of these assembly and testing operations may be needed to ensure acceptable yields for large scale manufacture.

An example of a laser-in-slider device 100 according to an example embodiment is shown in the perspective view of FIG. 1. In this example, an edge-emitting laser diode 102 is integrated into a trailing edge surface 104 of the slider 100. The laser diode 102 is integrated with a HAMR read/write head 106. The read/write head 106 has one edge located at an air bearing surface 108 of the slider 100. The air bearing surface 108 is held proximate to a moving media surface (not shown) during device operation. The laser diode 102 provides electromagnetic energy to heat the media surface at a point of the media near to where the read/write head 106 is positioned. Optical coupling components, such as a waveguide 110, are formed integrally (e.g., via layer deposition) within the slider device 100 to deliver light from the laser 102 to the media.

In this example, the laser diode 102 is recessed in a cavity 112 formed in the trailing surface 104 of the slider 100. The bottom of the cavity 112 includes a bottom surface 113 that interfaces with a lower surface (e.g., surface 202 described below) of the laser diode 102. The lower surface 113 includes solder bumps 114 that interface with corresponding bumps/pads formed on the laser 102. These solder bumps 114 facilitate bonding the laser 102 to the slider 100, provide electrical connectivity for the laser 102, and may provide other functions (e.g., heat sinking the laser 102, assuring proper alignment of an output facet 116 of the laser 102 with the waveguide 110, etc).

Figure 2A:
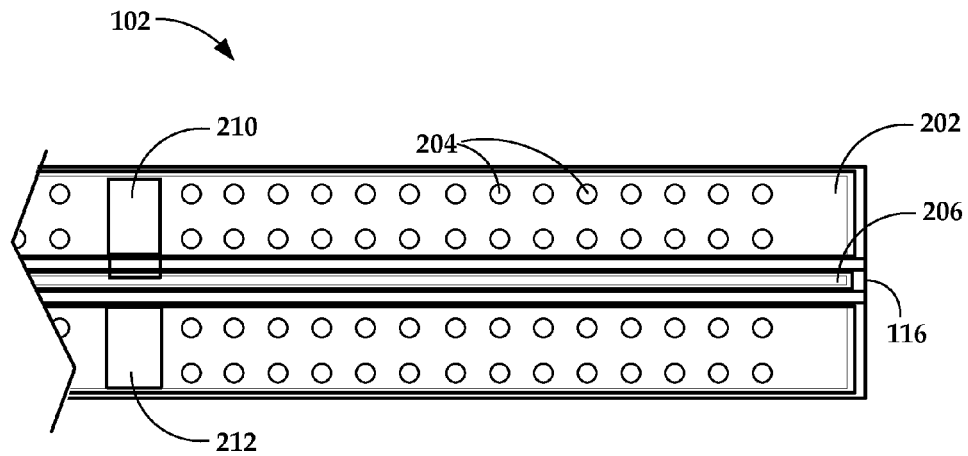
FIGS. 2A and 2B are respective bottom and perspective views of a laser diode according to an example embodiment.
Figure 2B:
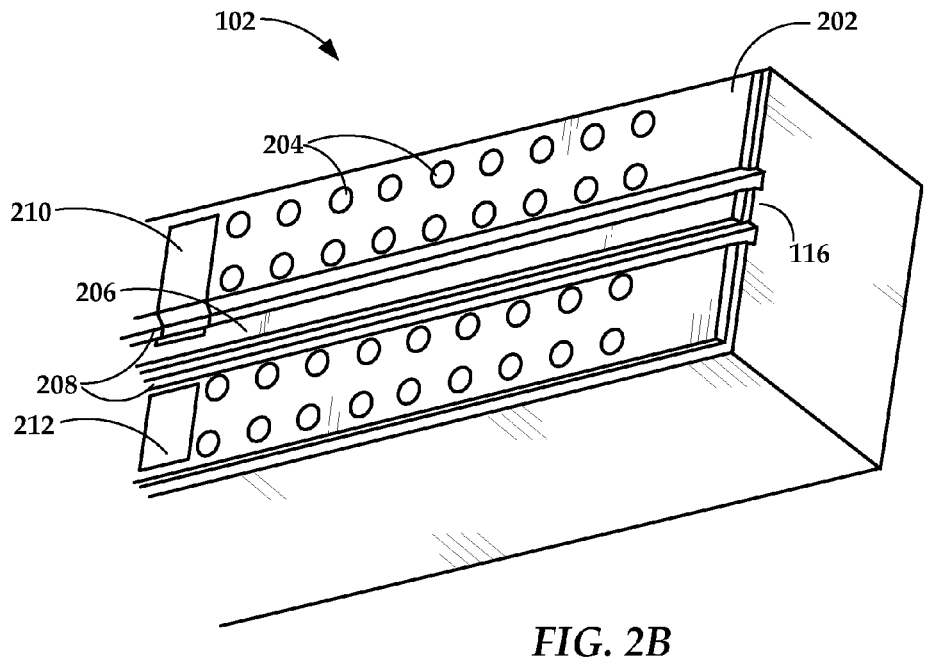

A more detailed view of alignment features of the edge-emitting laser diode 102 are shown in FIGS. 2A, 2B. In particular FIGS. 2A and 2B are respective bottom and perspective views showing electrical and optical interface features of a laser diode 102 such as is shown in FIG. 1. As previously described, the laser 102 includes on one end an output facet 116 that launches light into a waveguide (e.g., waveguide 110 in FIG. 1) for delivery to a HAMR media. The lower surface 202 of the laser 102 includes a plurality of solder pads 204 configured to interface with the solder bumps (e.g., bumps 114 in FIG. 1) on the slider device 100. A conductive surface (e.g., stripe) 206 is surrounded on either side by channels 208. The conductive surface 206 may facilitate electrically coupling an anode (or cathode) side of the laser 102 to a slider assembly during a bonding/reflow phase. The conductive surface 206 may also act as a heat sink when bonded to a slider assembly.

Also seen in FIGS. 2A and 2B are test pads 210, 212. These test pads 210, 212 are also located on lower surface 202 alongside the solder pads 204 and stripe 206, and may be respectively coupled to anode and cathode layers within the laser diode 102. Generally, the test pads 210, 212 facilitate automated testing of the laser 102 without risk of damaging the solder pads 204 and/or stripe 206.

Testing a semiconductor laser such as laser diode 102 may require an electrical connection from a test circuit to the laser's anode and cathode terminals. In typical semiconductor laser designs, the junction side is metalized to provide one terminal (e.g., the anode terminal), and the substrate side of the laser is metalized to provide the other terminal (e.g., the cathode terminal). These junctions are configured in such as way as to form an electrical coupling with the slider 100 upon installation. In the illustrated example, the junctions are configured as solder pads and center stripe 206.

In order to test such a configuration, test probes may be brought into contact with junctions 204, 206 in order to electrically couple the laser 102 to a test circuit. For some semiconductor laser designs, however, use of the coupling features 204, 206 for testing may be undesirable. For example, the design of junctions 204, 206 illustrated in FIGS. 2A-B and 3 may be designed (along with associated interfacing features of the slider) to physically align the laser 102 with the slider during reflow operation, e.g., in response to surface tension forces exerted by the reflowed solder that bonds the laser 102 to the slider. Thus the solder pads 204 and stripe 206 may perform both electrical and physical coupling of the laser 102, and proper alignment during this coupling may further depend on the solder pads 204 and stripe 206 being undamaged (e.g., dimpled, scratched) due to testing and/or handling of the laser 102.

In the illustrated semiconductor laser design and equivalents thereof, any contact to the slider-coupling connections (e.g., solder pads 204 and stripe 206) may damage the laser 102 and/or cause alignment problems during laser-to-slider assembly. Instead of using these junctions 204, 206 for testing, test probes can electrically test the laser 102 by contacting the test pads 210, 212. This facilitates electrical testing without requiring direct physical contact by test probes with the laser stripe 206 and solder pads. The test pads 210, 212 may only be intended for use as probe locations during testing, and need not be physically bonded to the slider assembly 100, e.g., via solder.

As shown, the test pads 210, 212 are disposed on the junction surface 202 of the semiconductor laser along with the coupling connections 204, 206. This co-location with the coupling connections 204, 206 on surface 202 may make the laser 102 easier to manufacture. The location of test pads 210, 212 on surface 202 may also render the test pads 210, 212 inaccessible after assembly of the laser to the slider, e.g., lower surface 202 faces corresponding surface 113 after laser placement. However, assuming solder reflow that bonds the laser 102 to the slider 100 is successful, there may be other contact points on the slider assembly 100 that facilitate testing the laser 102, such that access to the test pads 210, 212 is no longer needed.

Figure 3A:
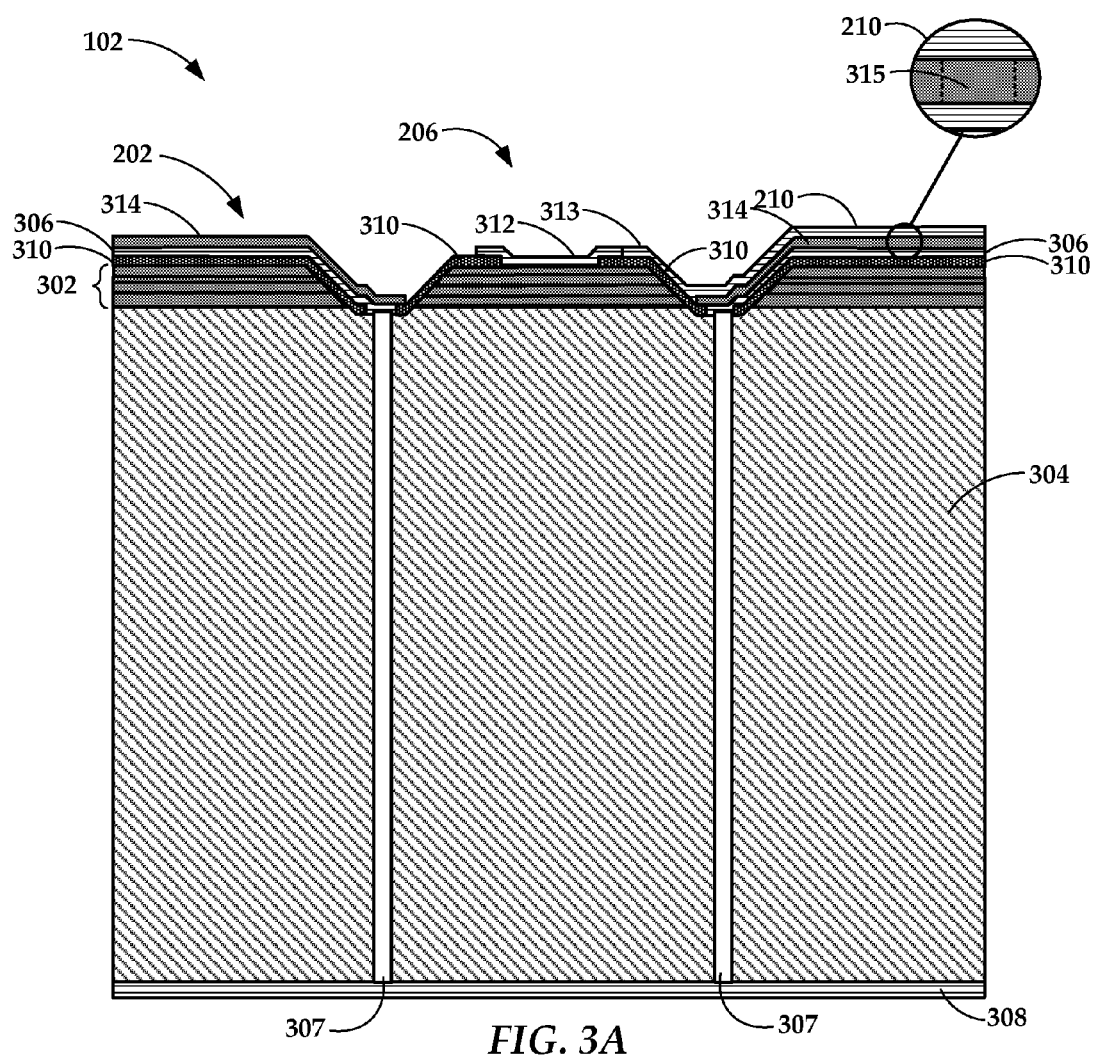
FIGS. 3A and 3B are a cross-sectional views of a laser diode according to example embodiments.

In reference now to FIG. 3A, a cross sectional view of a semiconductor laser 102 illustrates some additional details according to an example embodiment. As seen in this view, junction layers 302 are overlaid on top of a substrate 304. The junction layers 302 form the quantum well of the laser 102. Top and bottom cathode metal layers 306, 308 are in electrical contact with the substrate 304. The top cathode layer 306 may be used to form the solder pads 204, and may be electrically coupled to the bottom layer 308 thru the electrically conductive substrate 304 and/or through vias 307. The cathode metal layer 306 is kept isolated from the junction layers 302 by way of insulating layer 310. An isolation layer 314 covers the cathode layer 306, and may include vias (e.g., via 315) through which solder pads (e.g., solder pads 204 seen in FIGS. 2A-2B) are formed.

On the right-hand side of FIG. 3A, the isolation layer 314 is shown covered by a connection strip 313 that couples an anode metal layer 312 with one of the aforementioned test pads 210. The anode metal layer 312 extends along the center of the laser 102, and is in electrical contact with the semiconductor layers/quantum well 302. The anode layer 312 may be part of the stripe 206 seen in FIGS. 2A-2B. There may be a corresponding test pad (not shown) on the left-hand side of FIG. 3A, e.g., formed by exposure of layer 306 through isolation layer 314, and/or an additional layer on top of the isolation layer 314 that is coupled to layer 306, e.g., using vias.

The top most anode 312 and cathode 306 layers are both generally disposed near the top surface in FIG. 3A, which may generally correspond to surface 202 seen in FIGS. 2A and 2B. Because these layers 306, 312 are already proximate the top surface, the test pads 210, 212 may be formed on or near the same surface 202. For example, vias (e.g., similar to via 315) or the like through layer 314 may be used to couple a test pad to layer 306 on the left-hand side of the figure. The test pads may be formed so that they are co-planar or recessed compared to other bonding/alignment features such as solder pads or stripe 206. Placing the test pads at this relative height may ensure that the test pads do not later interfere with laser alignment.

For example, in reference again to FIG. 2B, the stripe 206 may protrude higher relative to a plane of surface 202 than solder pads 204. These height differences may be accounted for during assembly, e.g., by forming corresponding features on the slider 100 and/or by forming appropriately sized solder bumps/features on the slider 100 to account for height difference. In such a case, the test pads 210, 212 may be disposed substantially co-planar with the solder pads 204. In the inverse configuration (e.g., solder pads 204 protrude higher relative to surface plane than stripe 206), the test pads 210, 212 may be disposed substantially co-planar with the stripe 206. Where both solder pads 204 and stripe 206 are substantially co-planar, the test pads 210, 212 may also be co-planar with the solder pads 204 and stripe 206, or be at a lower level relative to a plane of surface 202 than either solder pads 204 or stripe 206.

It will be appreciated that the above description of 202 as a "surface" does not necessarily require that the surface 202 be planar. While the surface 202 may have a common plane for locating some (or even a majority of) features, some features may be non-co-planar with other features and still be considered as part of the surface 202. Generally, the surface 202 is at least intended to represent a three-dimensional mechanical interface of the laser 102 for coupling to slider 100 or other optical/electrical assembly. For example, processes such as etching, chemical-mechanical polishing/planarization, etc., may be used to alter heights of some features of the surface 202 relative to others. Thus, the description of an element being disposed on surface 202 is not intended to require that such element be co-planar with other elements also disposed on the surface 202.

Figure 3B:
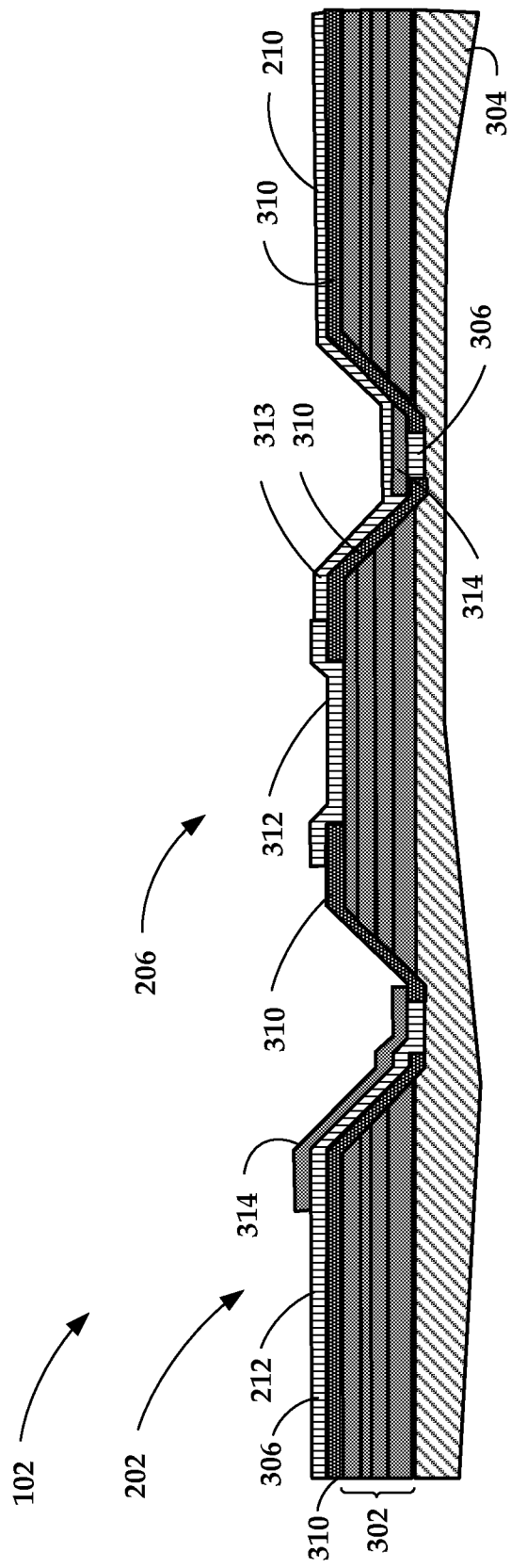

In FIG. 3B, a cutaway diagram illustrates an alternate arrangement of test pad layers as shown in FIG. 3A. In this example, test pads 210, 212 may be recessed relative to other features of surface 202. The cross section of FIG. 3B is taken where the test pads 210, 212 are located. At locations other than that shown in FIG. 3B, the anode and cathode layer 306, 312 in this configuration may be substantially similar to that shown in FIG. 3A (although without the connection strip 313 and test pad 210 at those locations). At this location, isolation layer 314 may be truncated/shortened on the left-hand side to expose part of cathode layer 306, and thereby form test pad 212. On the right-hand side (at the bottom of the channel), both the cathode layer 306 and isolation layer 314 are truncated/shortened. The connection strip 313 and test pad 210 are overlaid on top of the respective isolation layer 314 and insulating layer 310. In this way, the test pads 210, 212 may be situated lower relative to surface 202 than either the cathode layer 312 or isolating layer 314, which may correspond to the surface level of the stripe 206 and pads 204, respectively, as seen in FIG. 2.

Figure 4:
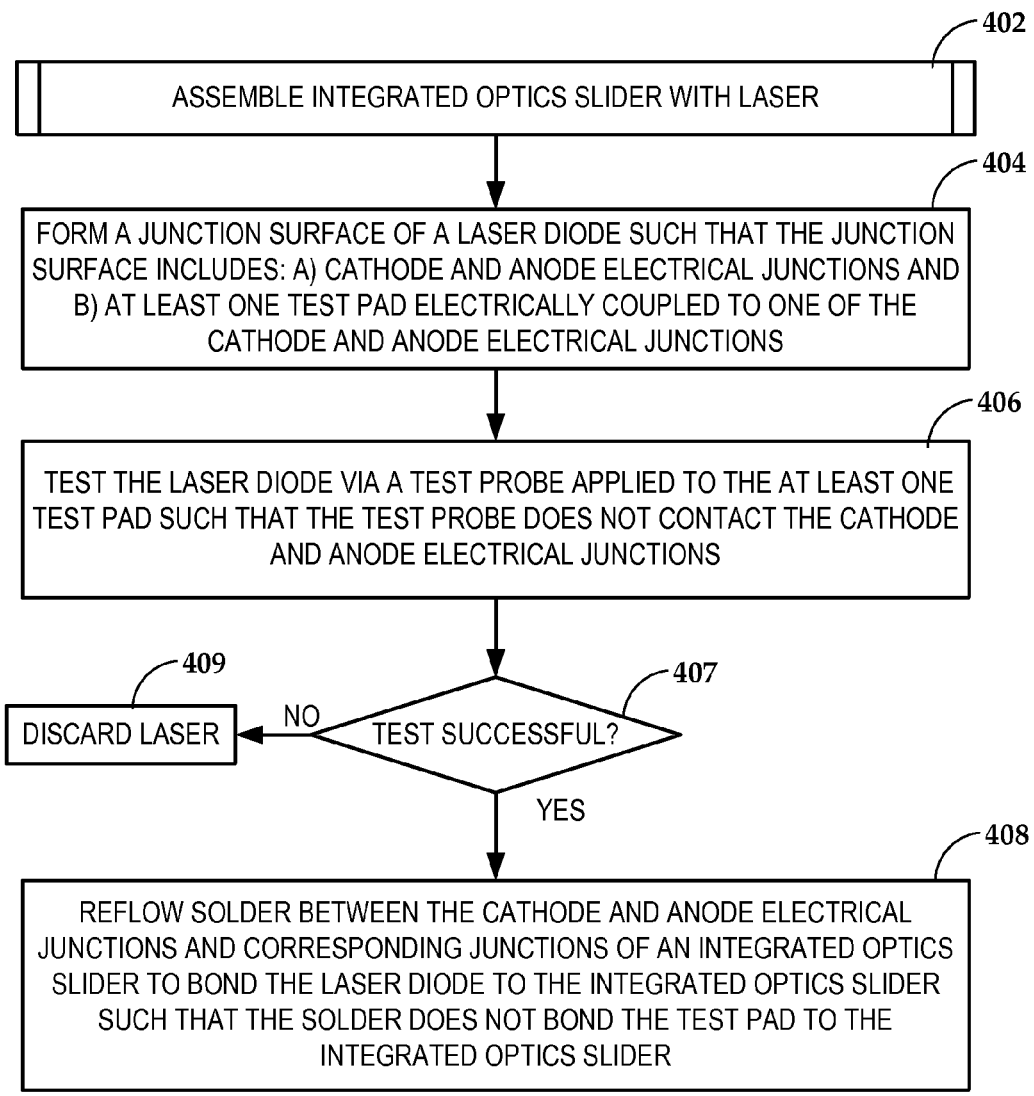
FIG. 4 is a flowchart illustrating a procedure according to another example embodiment.

In reference now to FIG. 4, a flowchart illustrates a procedure 402 for assembling an integrated optics slider according to an example embodiment. The procedure 402 involves forming 404 a junction surface of a laser diode. The junction surface includes: a) cathode and anode electrical junctions; and b) at least one test pad electrically coupled to one of the cathode and anode electrical junctions. The laser diode is tested 406 via a test probe applied to the at least one test pad. During the test 406, the test probe does not contact the cathode and anode electrical junctions.

The testing 406 may involve any electrical or optical test known in the art. For example, the testing the laser diode may involve testing one or more of laser light output power with drive current, output beam divergence, lasing spectrum, voltage across the laser diode for a given drive current, and aging characteristics for screening out early life failures prior to assembly. The testing may be performed in batches on assemblies (e.g., wafers, bars) and/or may be performed on individual laser diodes. If it is determined 407 that the test is not successful, the laser may be disposed of 409 (e.g., marked as failed if part of a batch test so that it is not further used during assembly).

If the test is successful, the method further involves reflowing 408 solder between the cathode and anode electrical junctions and corresponding junctions of an integrated optics slider to bond the laser diode to the integrated optics slider. This can occur after placement of the laser diode into the slider, e.g., setting of laser into cavity of the slider that facilitates alignment therebetween. This placement may cause the test pad (which may be located on a lower surface of the slider) to be disposed between the junction surface and a corresponding surface of the integrated optics slider. During the reflow 408, the solder does not bond the test pad to the integrated optics slider. Thus, if the test pad is damaged due to the testing for example, the damaged test pad does not affect alignment of the laser diode with the integrated optics slider.

The foregoing description of the example embodiments has been presented for the purposes of illustration and description. It is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the disclosure not be limited with this detailed description, but rather determined by the claims appended hereto.

What is claimed is:

1. A laser diode, comprising:
    a junction surface configured to interface with an integrated optics slider;
    cathode and anode electrical junctions disposed on the junction surface, wherein the cathode and anode electrical junctions are configured for electrical and mechanical coupling to the integrated optics slider; and
    at least one test pad disposed on the junction surface that is physically separate from and electrically coupled to one of the cathode and anode electrical junctions, wherein the test pad is configured to be contacted by a test probe and is not configured for electrical or mechanical coupling to the integrated optics slider.

2. The laser diode of claim 1, further comprising a second test pad disposed on the junction surface that is physically separate from and electrically coupled to the other of the cathode and anode electrical junctions, wherein the second test pad is not configured for electrical or mechanical coupling to the integrated optics slider.

3. The laser diode of claim 1, wherein the test pad is disposed in a cavity of the integrated optics slider after assembly of the laser diode to the integrated optics slider.

4. The laser diode of claim 1, wherein the cathode and anode electrical junctions are configured for bonding to solder bumps of the integrated optics slider during a reflow operation.

5. The laser diode of claim 4, wherein the cathode and anode electrical junctions are configured to align the laser diode with the integrated optics slider in response to surface tension effects of the solder bumps during the reflow operation.

6. The laser diode of claim 1, wherein the test pad is recessed on the junction surface relative to at least one of the cathode and anode electrical junctions.

7. An apparatus, comprising:
    an integrated optics slider comprising:
        a first junction surface; and
        first cathode and anode junctions disposed on the junction surface; and
    a diode laser coupled to the integrated optics slider, wherein the diode laser comprises:
        a second junction surface interfacing with the first junction surface;
        second cathode and anode electrical junctions disposed on the second junction surface and electrically and mechanically coupled to the first cathode and anode junctions; and
        at least one test pad disposed on the second junction surface that is physically separate from and electrically coupled to one of the second cathode and anode electrical junctions, wherein the test pad is configured to be contacted by a test probe and is not electrically or mechanically coupled to the first cathode and anode junctions.

8. The apparatus of claim 7, further comprising a second test pad disposed on the second junction surface that is physically separate from and electrically coupled to the other of the second cathode and anode electrical junctions, wherein the second test pad is not configured for electrical or mechanical coupling to the first cathode and anode junctions.

9. The apparatus of claim 7, wherein the test pad is disposed in a cavity of the integrated optics slider after assembly of the laser diode to the integrated optics slider.

10. The apparatus of claim 7, wherein the first and second cathode and anode electrical junctions are bonded via solder during a reflow operation.

11. The apparatus of claim 10, wherein the solder aligns the laser diode with the integrated optics slider in response to surface tension effects during the reflow operation.

12. The laser diode of claim 7, wherein the test pad is recessed in the second junction surface relative to at least one of the second cathode and anode electrical junctions.

13. A method comprising:
forming a junction surface of a laser diode, wherein the junction surface comprises cathode and anode electrical junctions and at least one test pad electrically coupled to one of the cathode and anode electrical junctions;
testing the laser diode via a test probe applied to the at least one test pad, wherein the test probe does not contact the cathode and anode electrical junctions; and
reflowing solder between the cathode and anode electrical junctions and corresponding junctions of an integrated optics slider to bond the laser diode to the integrated optics slider, wherein the solder does not bond the test pad to the integrated optics slider.

14. The method of claim 13, wherein, after the laser diode is bonded to the integrated optics slider, the test pad is disposed between the junction surface and a corresponding surface of the integrated optics slider.

15. The method of claim 13, wherein reflowing the solder aligns the laser diode with the integrated optics slider in response to surface tension effects of the solder during the reflow.

16. The method of claim 15, further comprising keeping the test pad free from solder so that, if the test pad is damaged due to the testing, the damaged test pad does not affect alignment of the laser diode with the integrated optics slider.

17. The method of claim 13, wherein the test pad is recessed in the junction surface relative to at least one of the cathode and anode electrical junctions.

18. The method of claim 13, wherein testing the laser diode comprises testing one or more of laser light output power, output beam divergence, lasing spectrum, voltage across the laser diode for a given drive current, and aging characteristics.

19. The method of claim 13, further comprising disposing the laser diode in a cavity of the integrated optics slider before reflowing the solder.

20. The method of claim 19, wherein the test pad is disposed in the cavity of the integrated optics slider after bonding of the laser diode to the integrated optics slider.

* * * * *